United States Patent [19]

McDonald

[11] Patent Number: 5,022,575
[45] Date of Patent: Jun. 11, 1991

[54] SIDE-HANDLE BATON RACK

[76] Inventor: Mack P. McDonald, 27801 Teal Rd., Montague, Calif. 96064

[21] Appl. No.: 479,646

[22] Filed: Feb. 13, 1990

[51] Int. Cl.⁵ .................................... B60R 7/00
[52] U.S. Cl. .................... 224/273; 224/914; 224/251
[58] Field of Search ............ 224/273, 275, 311, 324, 224/914, 191, 196, 200, 232, 234, 251; 248/309.1

[56] References Cited

U.S. PATENT DOCUMENTS

| | | | |
|---|---|---|---|
| 372,000 | 10/1887 | Wintz | 224/914 |
| 710,236 | 9/1902 | Audley | 224/914 |
| 4,009,854 | 3/1977 | Moyer | 224/914 |
| 4,662,552 | 5/1987 | Uyehara | 224/914 |
| 4,694,981 | 9/1987 | Miler, Jr. | 224/914 |
| 4,872,600 | 10/1989 | Corbin | 224/251 X |

FOREIGN PATENT DOCUMENTS 871563   5/1971   Canada .................... 224/914

Primary Examiner—Henry J. Recla
Assistant Examiner—Glenn T. Barrett

[57] ABSTRACT

A device to be mostly used in a fixed position such as mounted on the inside of a car door. It allows the quick and easy securing of a side-handle baton. This is done by sliding the shaft of a baton inside a tube. The side-handle of baton then makes contact with the opening of the device which is formed at an angle. The angled opening guides the side-handle into a slot that runs longitudinally in the device. The slot is made wide enough for the side-handle to travel through the device. The side-handle continues in this direction then makes a turn into a lateral slot. When the device is mounted correctly the weight of the side-handle causes it to rest in the lateral slot. The baton is now secured in the device unit it's called for. It can not slide in or out of device until the side-handle is lifted upwards into the longitudinal slot. The baton can be retrieved from the device very quickly and with almost no effort.

1 Claim, 1 Drawing Sheet

SIDE-HANDLE BATON RACK

FIELD OF INVENTION

This invention relates to a device that is mounted in a fixed position and will easily accept, contain, and retain a side-handle baton securely until needed.

PRIOR ART

The side-handle baton is fast becoming popular with Law Enforcement and other related fields. However, one problem an officer faces is where to put the baton when he can't wear it. One example of this is when he is sitting down in a patrol vehicle such as a car, boat, helicopter, A.T.V., etc. In my research of this subject matter all officers revealed disgust with the current methods of temporarily storing batons. Some are so frustrated they have resorted to not using these existing fixed position baton holders. This is a dangerous practice as an unsecured baton could endanger their safety. They may not be able to get to it when it's needed or be injured themselves with their unsecured baton.

Three methods currently used are as follows:

A. Molded rubber gripper clamps. These clamps have an opening and their inside diameter is slightly smaller than the outside diameter of the baton providing a squeezing effect. Gripper clamps are sold at hardware stores and were designed for hanging long handle tools such as brooms and rakes by their handles. A minimum of two of these gripper clamps are mounted in a fixed position, one securing the long shaft and one securing the short shaft of the baton. A third clamp is sometimes used to secure the side-handle of the baton. To secure the baton each clamp must be forced open with one hand. The other hand will force a section of the baton against the opening of the clamp. This is done to deform the clamp enough that it finally accepts that section of the baton. This is quite time consuming. And, after a period of time the clamp usually becomes permanently deformed or loses its grip strength.

B. Formed metal or plastic gripper clamps. Used with the same principal as previously mentioned. These clamps have a larger opening allowing somewhat easier securing but providing much less grip strength. It doesn't take much force to knock the baton out of the clamps and onto the ground. For example by accidently kicking it while exiting the vehicle or any other sudden jar. The metal clamps are known to scratch the exterior finish of the baton or tear uniform clothing. The plastic clamps sometimes break or mis-align.

C. Rubber hose. The long shaft of the baton enters the hose and eventually stops when the side-handle comes in contact with the opening of the hose. Sometimes a gripper clamp is utilized in this area to secure the side-handle, but again this is time consuming. If a clamp is not used and the hose is mounted on a door, it must be positioned at an angle. This is so the weight of the baton will keep it in the hose. Otherwise it may back out and possibly fall out of the hose. Or, it may back out partially and keep the door from opening or closing.

OBJECTS AND ADVANTAGES

The invention relates to a device which because of it's design will make it much easier to accept, contain, and retain a side-handle baton. A slot is placed longitudinally in a tubular shaped device. This slot allows passage of the side-handle of baton into the device. This slot changes direction into a lateral slot in the device. Because of the weight of the side-handle it will rest in the lateral slot. The Rack will retain the baton until it's called for.

The object of this invention is to provide an inexpensive and simple to use device for temporarily storing a side-handle baton. This will encourage it's use thereby increasing officer safety.

REFERENCE NUMERALS IN DRAWINGS

| | |
|---|---|
| 4 long shaft | 8 angled slot guide |
| 5 side-handle | 9 longitudinal slot |
| 6 short shaft | 10 slot stop |
| 7 opening | 11 lateral slot |

DESCRIPTION OF INVENTION

Figure 1:
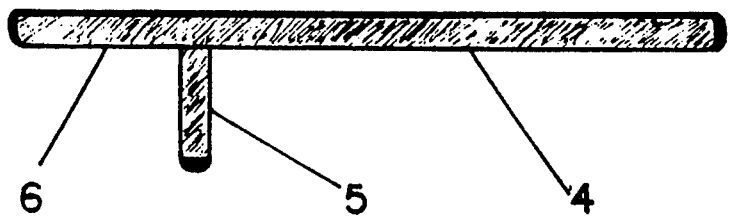
FIG. 1 is a view of a typical side-handle baton
Figure 2:
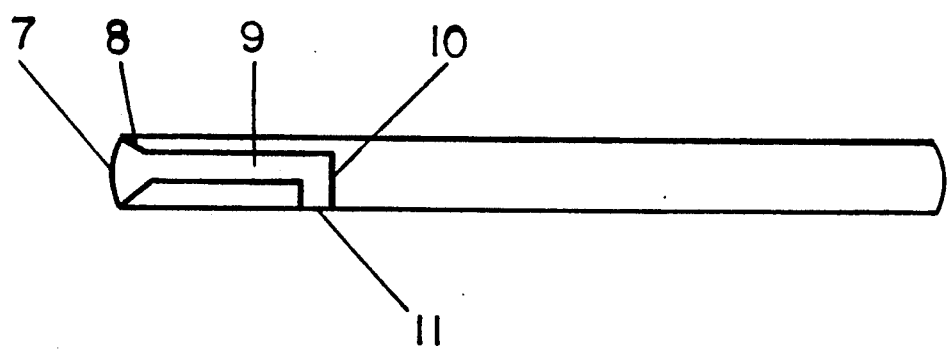
FIG. 2 is a view of the invention

FIGS. 1 to 2

Referring to FIG. 1 this will show the nomenclature of the typical side-handle baton. The long shaft 4, the side-handle 5, and the short shaft 6. I have included this information because most people are not familiar with this Law Enforcement tool.

Referring to FIG. 2 an embodiment of the invention is shown as a tube. The slots are made wide enough to allow side-handle to travel through the device. The tube will be constructed of rigid plastic or other similar materials. The inside diameter of the device will be larger than the outside diameter of the baton shaft.

At one end of the device is a opening 7. Opening 7 will be made at an angle on the device called a angled slot guide 8. Starting at guide 8, a longitudinal slot 9 begins. Slot 9 ends at a slot stop 10. Here, slot 9 changes it's direction into a lateral slot 11.

OPERATION OF INVENTION

Figure 3:
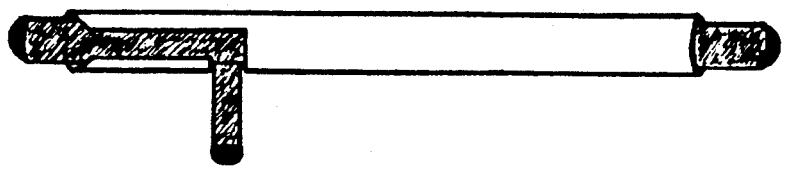
FIG. 3 is a view of the invention with the baton secured

FIGS. 2 to 3

Referring to FIG. 2 the long shaft 4 enters a opening 7 and begins to slide inside tube. As the baton shaft continues to slide inside tube, the side-handle 5 stikes a angled slot guide 8. Guide 8 helps manuever the side-handle into a longitudinal slot 9. The side-handle travels through slot 9 where it contacts slot stop 10. The side-handle then traverses into a lateral slot 11.

Referring to FIG. 3 this shows the baton in the secured position with the side-handle resting in the lateral slot 11.

The above description shall not be construed as limiting the ways in which this invention may be practiced but shall be inclusive of many other variations that do not depart from the broad interest and intention of the invention. Some of these variations may include; color, size, length, diameter, amount of openings, angles, stop position, etc.

Thus the scope of the invention should be determined by the appended claims and their legal equivalents, rather than by the examples given.

I claim:

1. A baton holder for a side handle baton having an elongated baton shaft having a first outside diameter and a short side handle which is disposed perpendicular to the elongated baton shaft and having a second outside diameter, said baton holder comprising: an elongated holder having first and second ends, an inner diameter sized to receive said first outside diameter of said baton shaft, and a longitudinal axis extending therethrough, said first end having an opening for receiving said baton shaft; a longitudinally extending slot in said holder adapted to receive said side handle for longitudinal movement of said baton within said holder, said slot having a first end connected with said opening and a second end; and a laterally extending slot in said holder adapted to receive said side handle for rotational movement of said baton within said holder, said laterally extending slot extending from said second end of said longitudinally extending slot.

* * * * *